(12) United States Patent
Wang et al.

(10) Patent No.: US 9,471,215 B2
(45) Date of Patent: Oct. 18, 2016

(54) METHOD FOR CONTROLLING DISPLAY OF A CONTEXT TOOLBAR

(71) Applicant: ZHUHAI KINGSOFT OFFICE SOFTWARE CO., LTD, Zhuhai, Guangdong (CN)

(72) Inventors: Hui Wang, Zhuhai (CN); Jian Zhu, Zhuhai (CN)

(73) Assignees: ZHUHAI KINGSOFT OFFICE SOFTWARE CO., LTD, Zhuhai (CN); ZHUHAI KINGSOFT SOFTWARE CO., LTD, Zhuhai (CN)

(*) Notice: Subject to any disclaimer, the term of this patent is extended or adjusted under 35 U.S.C. 154(b) by 69 days.

(21) Appl. No.: 14/358,594

(22) PCT Filed: Nov. 8, 2012

(86) PCT No.: PCT/CN2012/084281
§ 371 (c)(1),
(2) Date: May 15, 2014

(87) PCT Pub. No.: WO2013/071835
PCT Pub. Date: May 23, 2013

(65) Prior Publication Data
US 2014/0331168 A1  Nov. 6, 2014

(30) Foreign Application Priority Data
Nov. 17, 2011  (CN) .......................... 2011 1 0366190

(51) Int. Cl.
*G06F 3/048* (2013.01)
*G06F 3/0485* (2013.01)
(Continued)

(52) U.S. Cl.
CPC ........... *G06F 3/0485* (2013.01); *G06F 3/0482* (2013.01); *G06F 3/0488* (2013.01); *G06F 3/04842* (2013.01)

(58) Field of Classification Search
CPC ............. G06F 3/0482; G06F 3/04842; G06F 3/04847; G06F 3/0485
See application file for complete search history.

(56) References Cited

U.S. PATENT DOCUMENTS 5,664,133 A * 9/1997 Malamud ............. G06F 3/0482
                                                              345/902
5,854,629 A * 12/1998 Redpath ................ G06F 3/0482
                                                              715/830
(Continued)

FOREIGN PATENT DOCUMENTS

CN      102141894 A      8/2011
CN      102566900 A      7/2012
(Continued)

OTHER PUBLICATIONS

Detailed evaluation of Kingsoft Office Mobile Version for Android, Sep. 20, 2011, retrieved Feb. 23, 2013, from http://apk.pconline.com.cn/softinfo/cygy1109/2533610_all.html.

*Primary Examiner* — Jennifer To
*Assistant Examiner* — Joseph R Burwell
(74) *Attorney, Agent, or Firm* — Maschoff Brennan

(57) ABSTRACT

The present invention relates to a method for controlling display of a context toolbar, comprising: receiving a screen touch signal for displaying the context toolbar; determining a selected object according to the screen touch signal; selecting function buttons corresponding to the selected object, and obtaining an overall display width by summating the display width of the selected function buttons; comparing the overall display width with a preset value, when the overall display width≤the preset value, displaying the context toolbar, and displaying all the selected function buttons and a close button for closing the context toolbar in the context toolbar; and when the overall display width>the preset value, displaying the context toolbar, and displaying some of the selected function buttons and a close button for closing the context toolbar in the context toolbar, and in response to slide touch information.

1 Claim, 3 Drawing Sheets

(51) Int. Cl.
*G06F 3/0482* (2013.01)
*G06F 3/0484* (2013.01)
*G06F 3/0488* (2013.01)

(56) References Cited

U.S. PATENT DOCUMENTS

| | | |
|---|---|---|
| 7,782,308 B2 | 8/2010 | Shin et al. |
| 8,370,736 B2 | 2/2013 | Ording et al. |
| 8,601,389 B2 | 12/2013 | Schulz et al. |
| 2004/0261031 A1 | 12/2004 | Tuomainen et al. |
| 2007/0192725 A1* | 8/2007 | Chen ............... G06F 9/4443 715/779 |
| 2009/0073114 A1* | 3/2009 | Bay ............... G06F 3/0482 345/156 |
| 2009/0089678 A1* | 4/2009 | Sacco ............... G06F 17/3089 715/733 |
| 2009/0265656 A1* | 10/2009 | Jetha ............... G06F 3/0481 715/781 |
| 2010/0162165 A1* | 6/2010 | Addala ............... G06F 3/04886 715/810 |
| 2011/0078630 A1* | 3/2011 | Duquene ............... G06F 3/0482 715/823 |
| 2012/0260216 A1* | 10/2012 | Chen ............... G06F 9/4443 715/835 |
| 2013/0019182 A1* | 1/2013 | Gil ............... G06F 3/0482 715/738 |

FOREIGN PATENT DOCUMENTS

| | | |
|---|---|---|
| EP | 1 376 325 A2 | 1/2004 |
| EP | 1 785 824 A2 | 5/2007 |
| EP | 2 112 588 A1 | 10/2009 |
| WO | 2010/107653 A2 | 9/2010 |
| WO | 2010/126782 A1 | 11/2010 |

* cited by examiner

METHOD FOR CONTROLLING DISPLAY OF A CONTEXT TOOLBAR

FIELD OF THE INVENTION

The present invention relates to a method for controlling display of a context toolbar, particularly to a method for controlling display of a context toolbar on a handheld touch device (User can control the device by touching the touch screen of the device, e.g., iPhone 3, iPhone 4, HTC G11, HTC G14 mobiles etc.).

BACKGROUND OF THE INVENTION

A toolbar is a control bar on which a row of buttons for executing instructions are displayed. An action associated with a button can be executed by clicking the button on the toolbar. A context toolbar differs from a general toolbar in that (1) a context toolbar is not attached to a menu bar, and the location of a context toolbar changes depending on the operating position in the document; (2) a context toolbar is not always visible, but appears upon clicking, double-clicking, long-pressing or the like on the touch screen where corresponds to a location in the document. Currently, a problem is that the context toolbar contains relatively many buttons when there are relatively many (more than 5) operating commands to the document. However, the resolutions of the mobile devices on the market are not the same, and a mobile device having a low resolution can not display too many buttons, otherwise the area per button would be too small to create a good user experience.

Generally, there are two solutions to solve the problem:

As shown in FIG. 1, a first solution comprises placing all the function buttons on the context toolbar. When there are too many function buttons so that not all the function buttons can be displayed in one row, a "more" auxiliary button is added at the end of the context toolbar. The other function buttons will be displayed by clicking the "more" button, and the context toolbar will disappear by clicking anywhere outside the context toolbar. This solution has the following disadvantages. The other function buttons are hidden unless the "more" button is clicked. Especially when the screen is small, clicking a small button causes a poor user experience. User can view the other function buttons by clicking the "more" button, but he/she has to close and reopen the toolbar in order to go back to the previous function buttons, so that a poor user experience is caused. With respect to a toolbar where a function button needs to be clicked many times, the user has to open the toolbar repeatedly and click the function button.

As show in FIG. 2, a second solution comprises placing all the function buttons on the context toolbar. If the function buttons are too many to be displayed all in one row, they are displayed in two rows. By clicking anywhere outside the context toolbar, the context toolbar disappear. This solution has the following disadvantages. The visual effect is poor, especially on a mobile device having a small screen, and displaying the context toolbar in two rows makes the display crowded and redundant. The space of the screen are occupied and display of the content of the document is blocked. With respect to a tool bar where a function button needs to be clicked many times, the user has to open the toolbar repeatedly and click the function button.

SUMMARY OF THE INVENTION

The technical problem to be solved by the present invention is to provide a method for control the display of a context toolbar, which facilitates operation of the context toolbar and reading of the content by the user.

The above technical problem is solved by the following technical solutions:

A method for controlling the display of a context toolbar, comprising:

(1) receiving a screen touch signal for displaying the context toolbar;

(2) determining a selected object according to the screen touch signal;

(3) selecting function buttons corresponding to the selected object, and obtaining an overall display width by summating the display widths of the selected function buttons;

(4) comparing the overall display width with a preset value, when the overall display width≤the preset value, displaying the context toolbar and displaying all the selected function buttons and a close button for closing the context toolbar in the context toolbar; and when the overall display width>the preset value, displaying the context toolbar and displaying some of the selected function buttons and a close button for closing the context toolbar in the context toolbar, and in response to slide touch information, adjusting the displayed selected function buttons by rightward or leftward sliding action in the context toolbar of the user.

The context toolbar can have a variable display length. When the overall display width≤the preset value, the display length of the context toolbar is in a linear relationship with the overall display width. When the overall display width>the preset value, the display length of the context toolbar is fixed.

The context toolbar may have a fixed display length.

As can be seen from the above solutions, the present invention has the following advantages. The display of the function buttons can be adjusted in a manner of slide touch. As compared with the first solution described in the background part, function buttons in the present invention can be displayed back and forth easily. As compared with the second solution described in the background part, the problem that not all the function buttons can be displayed in one row (or column) is solved, so the context toolbar will not block the document too much and the visual effect is good. With respect to a context toolbar having one or more buttons that are needed to be clicked multiple times, the user no longer needs to open the context toolbar repeatedly because of the additional "close" button. The user can simply click the "close" button to close the context toolbar after he/she finishes the action of repeatedly clicking the function buttons.

DETAILED DESCRIPTION OF THE EMBODIMENTS

A method for controlling the display of a context toolbar, including:

(1) receiving a screen touch signal for displaying the context toolbar;

For example, the screen touch signal can be a fast double-click or a long-press or some other operation at a place on the screen where corresponds to a location in the document.

(2) determining a selected object according to the screen touch signal;

For example, when the object that corresponds to the place on the screen operated by the double-click or long-press or the some other operation is an image, the image is a selected object; when the object that corresponds to the place on the screen operated by the double-click or long-press or the some other operation is a text, the text is a selected object.

(3) selecting function buttons corresponding to the selected object, and obtaining an overall display width by summating the display widths of the selected function buttons;

For example, when the selected object is an image, generally the following function buttons are needed: enlarge, save, view, copy, paste, and property. When the selected object is a text, generally the following function buttons are needed: copy, cut, paste, select, select all. Of course, all the function buttons and their corresponding relationship with the objects are predetermined by the developer. More different function buttons can be designed for different objects if necessary.

Figure 1:
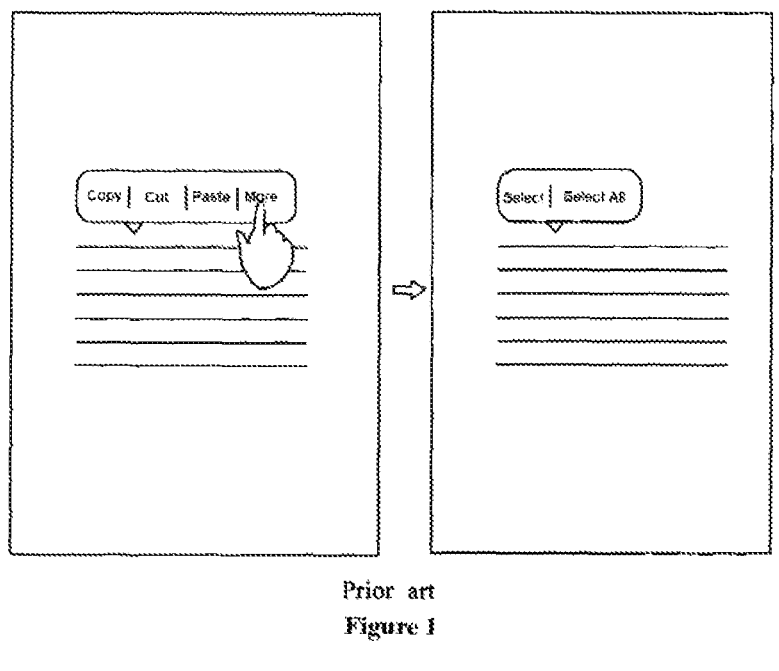
FIG. 1 illustrates the first solution described in the background.
Figure 2:
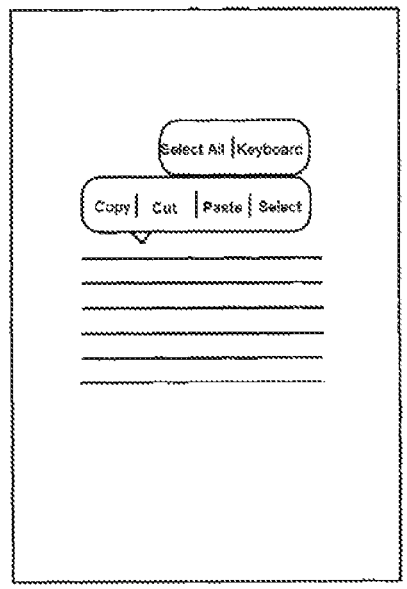
FIG. 2 illustrates the second solution described in the background.
Figure 3:
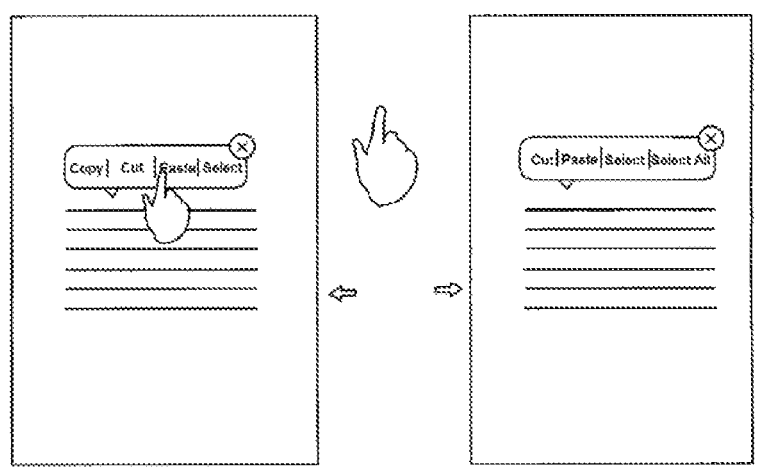
FIG. 3 illustrates the action of slide touching the context toolbar according to the present invention.

(4) comparing the overall display width with a preset value, when the overall display width≤the preset value, displaying the context toolbar, and displaying all the selected function buttons and a "close" button for closing the context toolbar in the context toolbar; and when the overall display width>the preset value, displaying the context toolbar, and displaying some of the selected function buttons and a close button for closing the context toolbar in the context toolbar, and in response to slide touch information, adjusting the displayed selected function buttons by rightward or leftward sliding action in the context toolbar of the user, as shown in FIG. 3.

Specifically, the preset value in step (4) can be determined according to the size of the screen. For example, when the context toolbar is displayed horizontally, the preset value=a*lateral dimension of the screen, where 0<a<1; and when the context toolbar is displayed vertically, the preset value=b*longitudinal dimension of the screen.

From an aesthetic perspective, the inventor of the present invention proposes the following design of the display of a context toolbar: when the overall display width≤the preset value, the display length (L) of the context toolbar is in a linear relationship with the overall display width (H), e.g., $L=r*H+c$, where $r\geq 1$, $c\geq 0$; when the overall display width>the preset value, the display length of the context toolbar is fixed. Of course, the display length of the context toolbar can always be a fixed value.

The present invention is not limited to the above embodiments. Those equivalents that are made based on the embodiments herein without inventive effort fall within the scope of the invention.

The invention claimed is:

1. A method for controlling display of a context toolbar, comprising:

(1) receiving a screen touch signal for displaying the context toolbar;

(2) determining a selected object according to the screen touch signal;

(3) selecting function buttons corresponding to the selected object, and obtaining an overall display width by summating display widths of selected function buttons;

(4) comparing the overall display width with a preset value, when the overall display width≤the preset value, displaying the context toolbar, and displaying all the selected function buttons and a close button for closing the context toolbar in the context toolbar; and when the overall display width>the preset value, displaying the context toolbar, and displaying some of the selected function buttons and a close button for closing the context toolbar in the context toolbar, and in response to slide touch information, adjusting the displayed selected function buttons by rightward or leftward sliding action in the context toolbar of a user;

(5) the context toolbar has a variable display length, wherein when the overall display width≤the preset value, the display length of the context toolbar is in a linear relationship with the overall display width; and when the overall display width>the preset value, the display length of the context toolbar is fixed.

* * * * *